Dec. 8, 1925.  
R. BLADES  
1,564,317  
APPARATUS OR MACHINE FOR HANDLING HIDES  
Filed July 12, 1923  
5 Sheets-Sheet 1
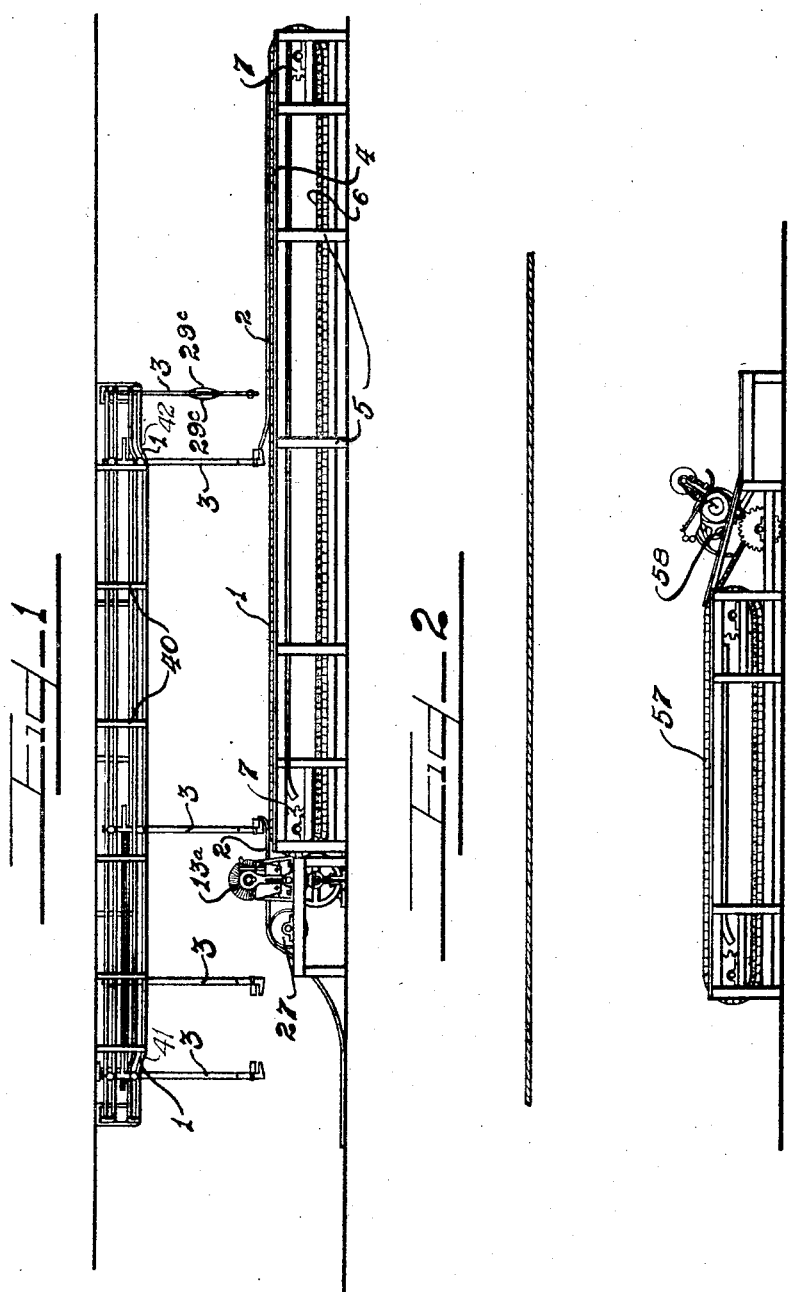
Witnesses  
Inventor  
Robert Blades  
by  
Attys.

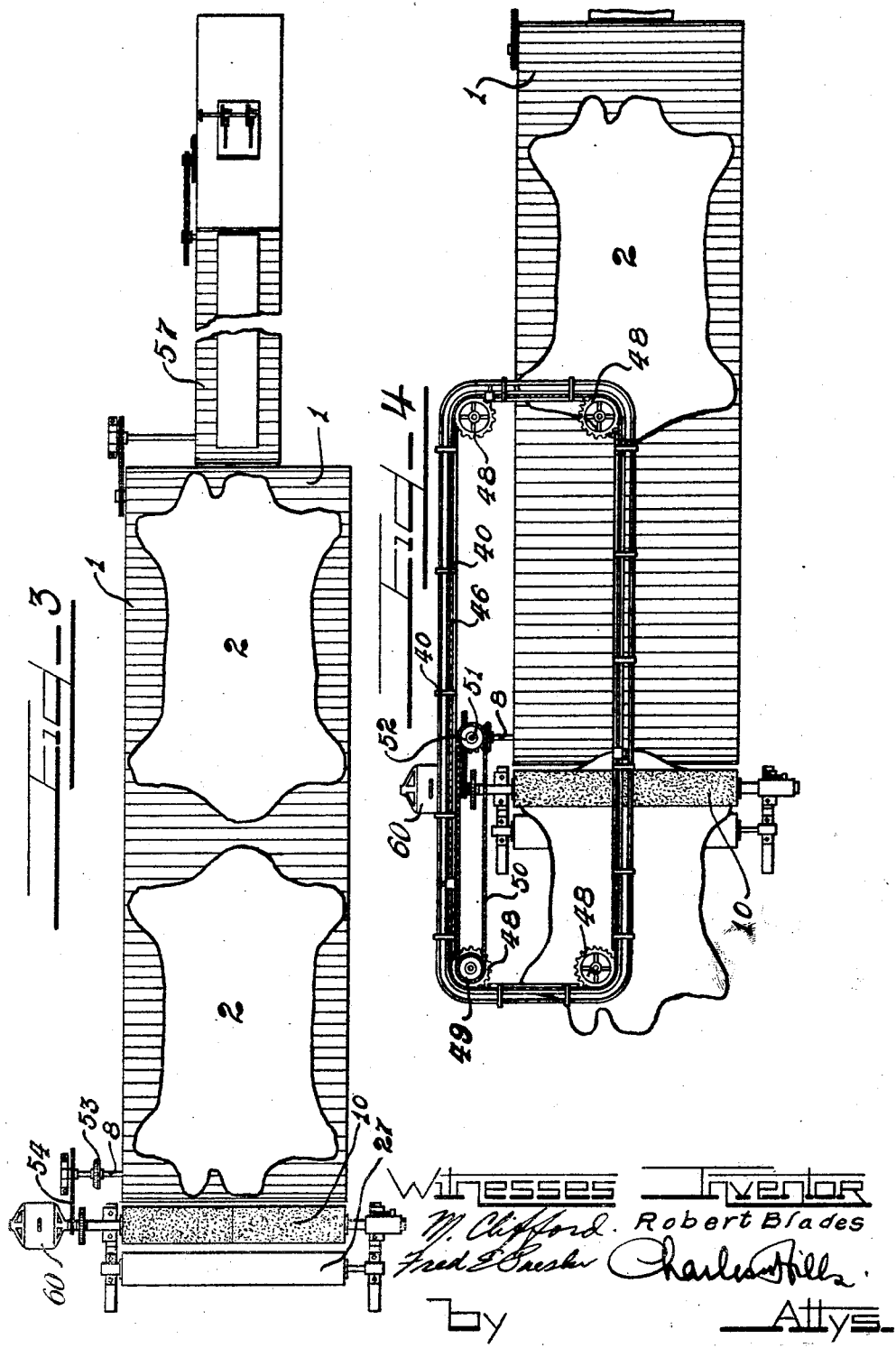

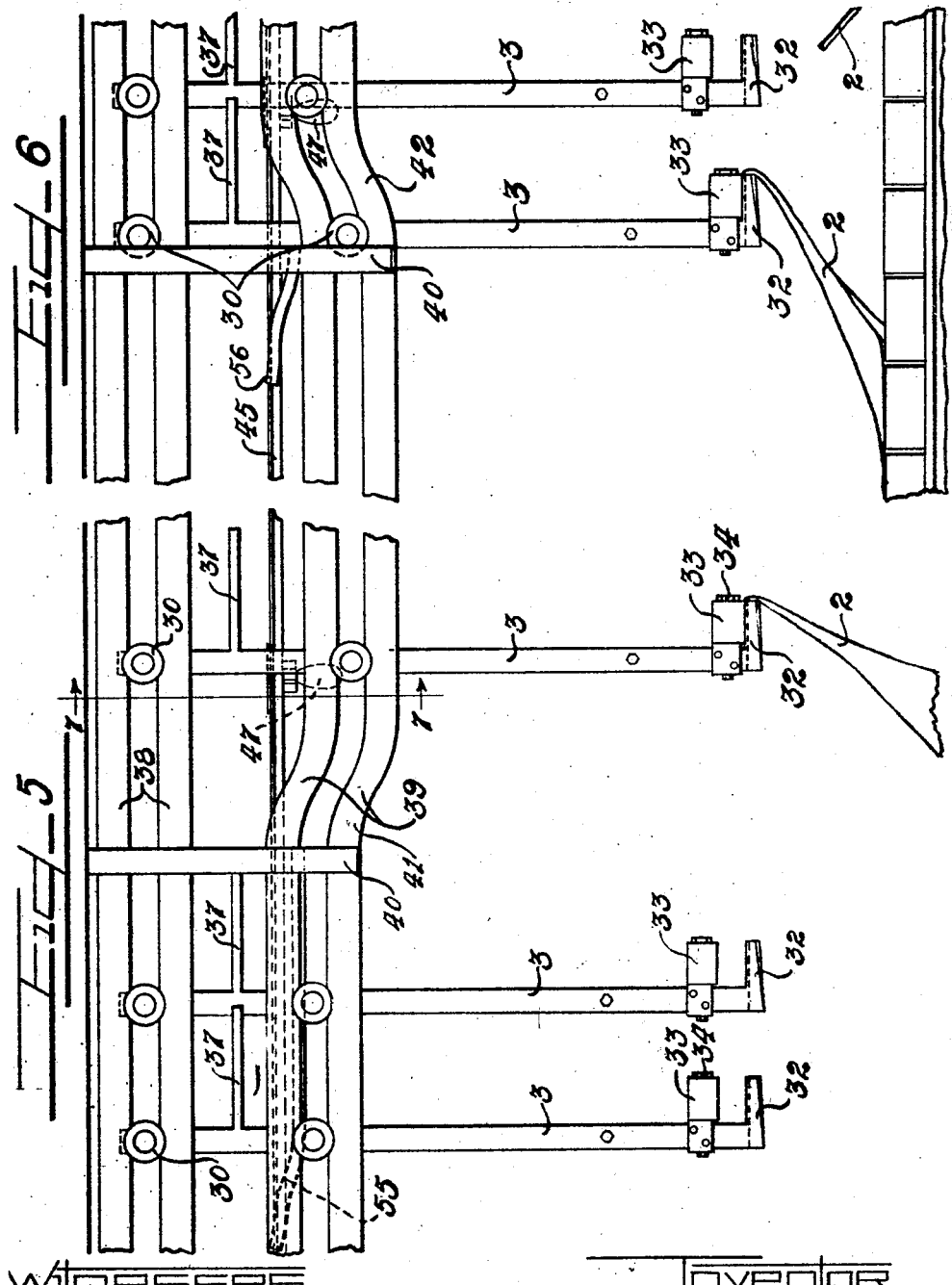

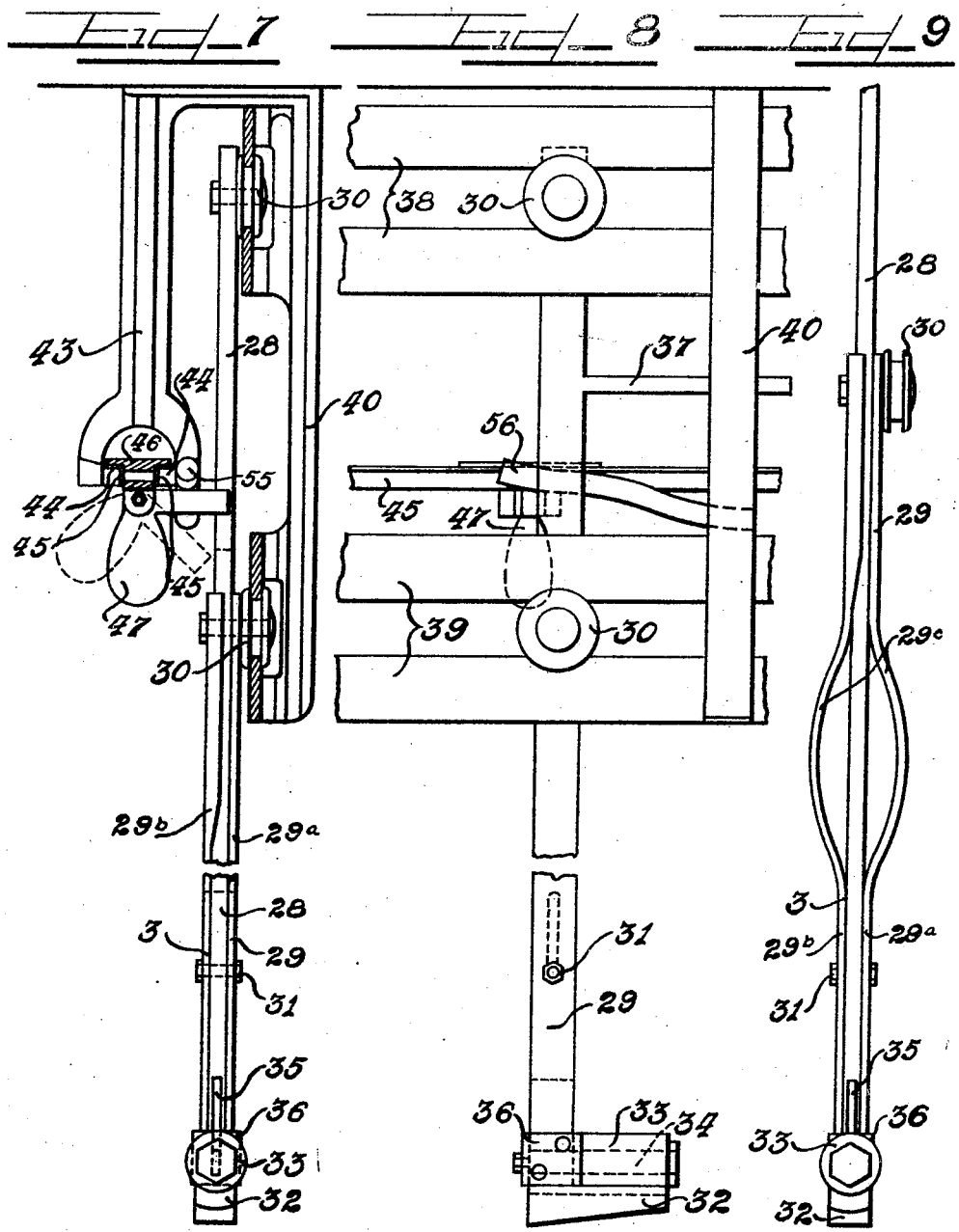

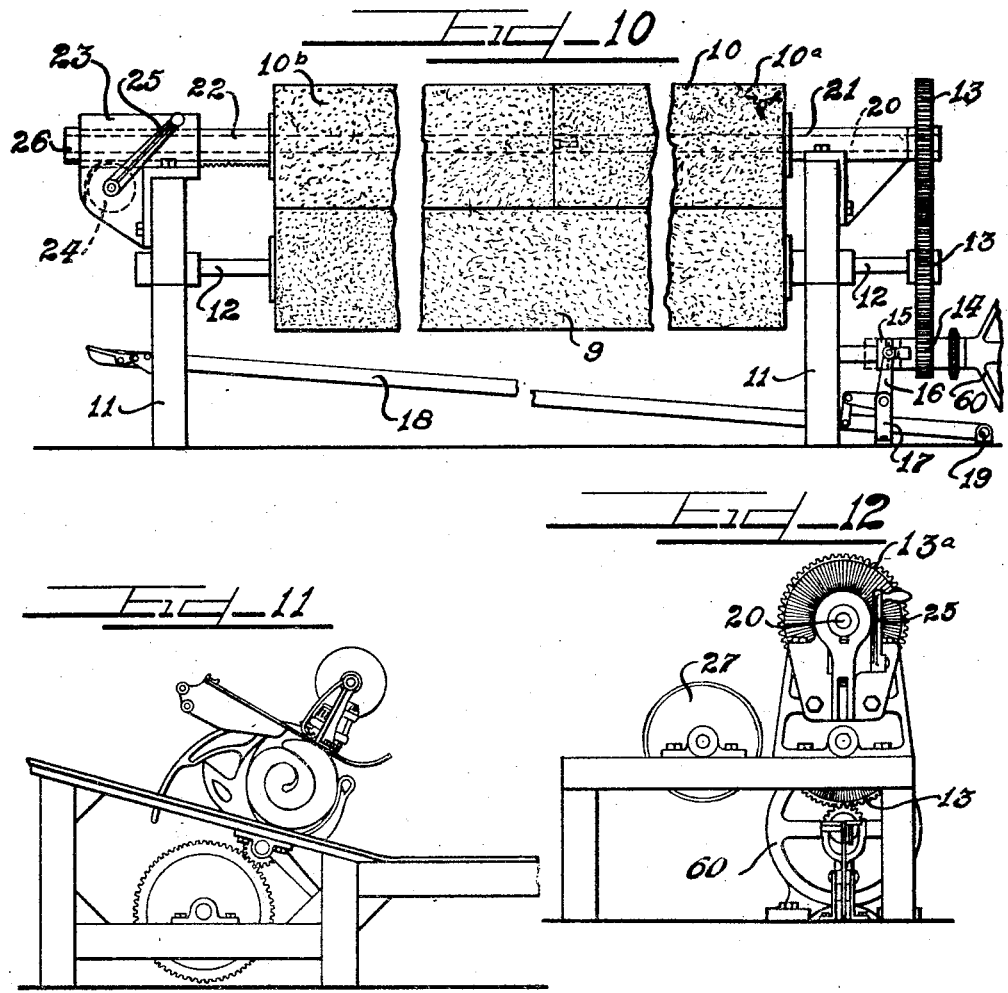

Patented Dec. 8, 1925.

1,564,317

UNITED STATES PATENT OFFICE.

ROBERT BLADES, OF CHICAGO, ILLINOIS.

APPARATUS OR MACHINE FOR HANDLING HIDES.

Application filed July 12, 1923. Serial No. 651,023.

*To all whom it may concern:*

Be it known that I, ROBERT BLADES, a citizen of the United States, and a resident of the city of Chicago, in the county of Cook and State of Illinois, have invented certain new and useful Improvements in an Apparatus or Machine for Handling Hides; and I do hereby declare that the following is a full, clear, and exact description of the same, reference being had to the accompanying drawings, and to the numerals of reference marked thereon, which form a part of this specification.

This invention relates to an apparatus or machine for handling hides wherein the hides are adapted to be conveyed for inspection purposes and turned over so that both sides may be inspected, and wherein the hides are bundled for shipment.

The invention comprises the novel mechanism and combinations hereinafter described and more particularly pointed out and defined in the appended claims.

In the accompanying drawings, which illustrate a preferred embodiment of this invention, and in which similar reference numerals refer to similar features in the different views:

Figure 1 is an elevational view of a part of the apparatus.

Figure 2 is an elevational view of another part of the apparatus.

Figure 3 is a top plan view of the apparatus with parts removed.

Figure 4 is a top plan view of the apparatus showing the part omitted in Fig. 3 and with the bundling mechanism omitted.

Figure 5 is an enlarged fragmentary elevational view of the guideway and hide carrying members.

Figure 6 is an enlarged fragmentary elevational view of the guideway and hide carrying members in a different position.

Figure 7 is an enlarged sectional view taken upon the line 7—7 of Fig. 5 with parts in elevation.

Figure 8 is an enlarged fragmentary elevational view of a hide carrying member supported in the guideway.

Figure 9 is an enlarged edge elevational view of a hide carrying member with the upper part broken away.

Figure 10 is an elevational view of the brushing rolls.

Figure 11 is a side elevational view of the bundle tying mechanism.

Figure 12 is a side elevational view of the rolls.

As shown on the drawings:

In referring now to the drawings, there is shown in Fig. 1 an endless conveyer 1 over which the hides 2 are adapted to be drawn by one of the carriers 3 which are supported in suitable guideways and propelled by an endless traveling member. When the forward end of the hide reaches substantially the middle of the table, the driving connection between the hide carrier 3 and its propelling mechanism is broken so that the carrier 3 will remain stationary, the conveyer 1, however, continues to travel carrying the hide with it, which will double upon itself and turn over so that an inspector may also observe the reverse side of the hide. At a predetermined time, the carrier 3 will be shifted onward to release the hide as will be hereinafter more fully explained. The hide is then passed to another conveyer where it is manually folded and passed through the tying mechanism.

The conveyer consists of a flexible endless platform which travels in an oblong path. The upper portion of the conveyer moves over a supporting structure or table 4 supported by the standards 5. The conveyer may consist of narrow slats connected together with sprocket chains 6 connected to the lateral margins and passing over suitable sprocket wheels 7 journalled in suitable supports, one set of sprocket wheels being mounted upon a driving shaft 8 which may be connected to a motor. Such a form of traveling conveyer is well known and needs no further description.

At the front end of the conveyer are a pair of brushing rolls 9 and 10 between which the hides are passed to brush off the salt and other adhering matter. In referring to Fig. 10, it will be observed that a pair of vertical supports 11 are secured adjacent the front end of the conveyer. The lower roll 9 is provided with suitable trunnions 12 which may be the ends of a shaft extending therethrough. These trunnions are journalled in the vertical supports 11, one trunnion extending through its support and being provided with a gear 13 which meshes with a gear 14 loosely mounted upon a motor shaft and adapted to be connected thereto through a clutch 15 slidably mounted upon the motor shaft, the hub of the gear and clutch member 15 having adjacent interlocking parts adapted to be brought together for interlocking engagement. A bell crank lever 16 is connected to the clutch and pivoted at its apex to a vertical support 17. The free end of the bell crank lever is connected to a lever 18 pivoted at one end as at 19 and extending to the opposite sides of the rolls.

The upper brushing roll 10 consists of two sections 10$^a$ and 10$^b$, which are respectively secured to the two sections of a sectional shaft 20, the adjacent ends of the sections being in slidable telescopic relation. The ends of the shaft 20 are rotatably journalled in bearings 21 and 22, the former of which is rigidly secured upon an upright support 11, while the latter is slidably mounted in a bracket bushing 23 secured upon the other upright support. The lower surface of the bearing 22 is provided with gear teeth to form a gear rack. A gear 24 is rotatably supported by the bracket bushing 24 and meshes with the gear rack. A crank handle 25 is connected to the shaft that supports the gear 24 and is adapted to be manually actuated for rotating the gear and longitudinally moving the bearing 22. A nut or abutment 26 upon the outer end of the shaft section that supports the roll 10$^b$ causes the said shaft section to partake of the longitudinal shifting movements of the bearing. As the roll section 10$^b$ is secured upon its shaft section, it is evident that rotation of the crank 25 will cause a separation between the roll sections. This separation of the upper roll sections provides a space therebetween through which the hide carriers are adapted to pass, as will later appear. The shaft 20 has a gear 13$^a$ upon one end that meshes with the gear 13 whereby rotation may be imparted thereto. An ordinary feed roll such as indicated at 27, Fig. 1, may guide the hides to the brushing rolls.

The hide carriers are best shown in Figs. 7, 8 and 9. Each consists of a pair of telescopic members 28 and 29. A grooved pulley roller 30 is rotatably mounted upon the upper end of each member. In the present embodiment of this invention, the member 29 consists of a pair of spaced connected plates 29$^a$ and 29$^b$ between which the member 28 is slidably secured, a portion of the plates 29$^a$ and 29$^b$ intermediate their ends being bowed outwardly as indicated at 29$^c$ to provide resilient or flexible sections. The upper end of the member 29 is spaced some distance below the top of the member 28 and the roller 30 is rotatably mounted thereon by means of a stud extending through the plates 29$^a$ and 29$^b$ and through a suitable slot in the member 28 to allow relative sliding movement. Below the flexible section, the plates may also be connected by a bolt 31 passing through a slot in the member 28. The lower end of each member 28 is provided with a jaw member 32, and the lower end of each member 29 is provided with a roller 33 which is rotatably mounted upon a stud 34 which extends through a suitable slot 35 in the member 28 and is secured by a U-shaped bracket 36 or the like secured to the lower end of the member 29. The jaw member 32 and roller 33 act as a vise, to grip the hide therebetween, and may be termed co-operating gripping elements, which are moved together or apart by the relative slidable movements of the members 28 and 29. At a suitable point below the roller 30, each member 28 is provided with a forwardly projecting stud 37 having a forked end for a purpose that will later appear.

These hide carriers are supported in guideways above the conveyer. The guideways are of oblong or rectangular form as shown in Fig. 4 and consist of two pair of spaced rails 38 and 39 between which the rolls 30 are adapted to track. These guideways are supported by vertical hangers 40 suspended from the ceiling or the like. The upper rollers 30 of the hide carriers are guided by the rails 38 which are of uniform elevation, while the lower rolls 30 are guided by the rails 39 which are downwardly offset between the points 41 and 42, as shown in Fig. 1, the connecting portions between the offset portions and the main portions of the rails 39 being on a slope.

The suspended hangers 40 are provided with depending arms 43 (Fig. 7) having bifurcations at their lower ends; the jaws of the bifurcations are provided with interior square lugs 44 which form supports for angles 45. These angles are so arranged that their horizontal flanges rest upon the lugs 45; the vertical flanges depend and define a guideway therebetween for an endless member 46 in the form of a chain or the like. The endless member 46 spans the lower guideway and overlaps the angles 45 which thuswise support the same. Impellers 47 are pivoted at intervals to the lower surface of the endless member 46. These impellers are in the nature of gravity pawls having arms that extend in the path of the carriers 3 and downwardly extending weights that automatically swing and maintain the arms thereof in the path of the hide carriers 3.

The endless member 46 is trained over suitable sprocket wheels 48 (Fig. 4) suitably supported adjacent the guideway. A small sprocket wheel 49 is secured in a coaxial relation with one of the sprockets 48, and a sprocket chain 50 is trained over the sprocket wheel 49 and over a second sprocket wheel 51 secured upon the upper end of a vertical shaft 52 which is geared at its lower end to a gear 53 (Fig. 3) upon the shaft 8 which is connected by sprocket gearing 54 to the motor 60.

When the motor is running, the endless member 46 will travel around the sprockets 48 through the aforedescribed mechanism, carrying the impellers 47 therewith which engage certain hide carriers 3 between the upper and lower rolls 30 and cause the same to travel around the guideways, and any hide carrier that is not in engagement with an impeller and that is directly in front of one that is impelled will be pushed along by the forked end of the projection 37 of the impelled carrier.

In front of the offset end 41 of the lower track or guideway there is a cam 55 (Fig. 5) under which the horizontal arm of the impeller passes for tilting the same out of engagement with the hide carrier, as shown in dotted line in Fig. 7. Therefore, during the operation of the endless member 46, the hide carriers will be dropped or disconnected at the approach to the offset portion of the lower guideway, while the endless member continues its travel. The operator may, therefore, readily manually advance the dropped hide carrier beyond the cam 55 and position the hide between the gripping elements. If desirable, the carrier may then be manually advanced until the lower roller 30 descends into the offset of the lower guideway whereby the upper gripping element 33 will be forced down against the jaw member 32 to grip the hide; the resilient portions 29ᶜ preventing any undue strain. As the endless member 46 continues its travel as before related in a predetermined time or period, an impeller 47 will be brought into engagement with the hide carrier and impel the same to draw the hide through the brushing rolls and on to the conveyer 1 which is moving at equal speed and into the position shown in Fig. 6, where a second cam 56 will disengage the impeller 47, the hide having been moved a distance to bring it flat upon the conveyer 1 which is moving at equal speed. The hide holding carrier will hence remain in its released position at the end of the offset position, as shown in Fig. 6, but still holding the hide. The continued rotation of the conveyer will carry the hide along and reverse the same as shown in Fig. 4, so that an inspector may examine both sides thereof. In the meantime, another hide will have been attached to another hide carrier which will carry the same over the conveyer for inspection and when this second hide carrier reaches the cam 56 its forked projection 37 will engage the first hide carrier and advance it into the raised portion of the guideway formed by the rolls 39, thereby releasing the hide it is holding. In this advanced position of the first hide carrier 3, it will be in a position to be engaged by an impeller 47 and be carried around the guideways. The second hide carrier will of course be disengaged from the impeller by the cam 56 and remain stationary until a third carrier comes along to advance it as just explained with respect to the first hide carrier. It will of course be understood that the rolls 10ᵃ and 10ᵇ must be separated during the operation of the machine.

After a hide has been reversed and released as shown in Fig. 4, it is manually folded in a longitudinal direction and passed on to a narrow auxiliary conveyer 57 at the rear of the conveyer 1. This auxiliary conveyer 57 may be similarly supported and operated as the main conveyer. At the rear end of this auxiliary conveyer, there is a binder or tying mechanism 58 (Fig. 2) of any well-known construction. As the longitudinally folded hide is carried along by the auxiliary conveyer as shown in Fig. 3, it is manually folded in a transverse direction to form the same into a bundle which then passes through the tying mechanism and is tied or bound with suitable twine.

From the foregoing it will be apparent that a very simple and efficient apparatus or machine has been invented for handling hides for inspection purposes and tying the same in bundles after proper inspection thereof.

I am aware that numerous details of construction may be varied through a wide range without departing from the principles of this invention, and I therefore do not purpose limiting the patent granted otherwise than necessitated by the prior art.

I claim as my invention:

1. In an apparatus of the class described, a longitudinally traveling conveyer, a hide carrier comprising a pair of relatively movable members having gripping elements for gripping a hide therebetween, a roller supported by each member of said carrier, guideways for receiving said rollers and supporting said carrier, one of said guideways having an offset portion, and means for impelling said carrier over said conveyer.

2. In an apparatus of the class described, a conveyer, guideways supported above said conveyer, a hide carrier comprising relatively movable members each supported in one of said guideways, and mechanism for impelling said hide carrier around said guideways including means for engaging and disengaging said carrier.

3. In an apparatus of the class described, a conveyer, a pair of guideways supported above said conveyer, a hide carrier comprising relatively movable gripping members supported by said guideways, means for impelling said carriers around said guideways, said guideways being so constructed that said gripping members operate automatically.

4. In an apparatus of the class described, a horizontally traveling conveyer, hide carriers, means for supporting and impelling said hide carriers over said conveyer, and means for stopping a hide carrier at a predetermined point for allowing said conveyer to reverse the hides.

5. In a machine of the class described, a conveyer, brushing rolls adjacent the front end of said conveyer, one of said rolls consisting of portions separable longitudinally of their axis, a guideway supported above said conveyer, hide carriers supported by said guideway and adapted for passing between said spaced rolls for drawing a hide on said conveyer, and means for impelling said carriers.

6. In an apparatus of the class described, a conveyer, guideways supported above said conveyer, a hide carrier comprising relatively movable members each supported in one of said guideways, an endless moving member adjacent said guideways, impellers carried by said endless member for impelling said carriers around said guideways, and means included by said impellers for engaging and disengaging said carriers at certain points in their travel.

7. In an apparatus of the class dscribed, a conveyer, guideways supported above said conveyer, a hide carrier comprising relatively movable gripping members supported by said guideways, said guideways being so constructed that said gripping members operate automatically, and mechanism for impelling said hide carrier around said guideways including means for engaging and disengaging said carrier.

8. In an apparatus of the class described, a conveyer, guideways supported above said conveyer, a hide carrier comprising relatively movable gripping members supported in said guideways, mechanism for impelling said hide carrier around said guideways including means for engaging said hide carrier, and means for disengaging said engaging means from said carrier at certain points in the travel of said carrier around said guideways, said guideways being so constructed that said gripping members operate automatically to grip a hide and subsequently to release the hide.

9. In an apparatus of the class described, a traveling conveyer, a guideway thereabove, hide carriers supported in said guideway, a movable endless member having means for impelling said hide carriers over said conveyer, and means for disengaging said impelling means at a predetermined point for allowing said conveyer to reverse the hides.

10. In a machine of the class described, a conveyer, guideways supported above said conveyer, hide carriers each comprising relatively movable gripping members supported in said guideways, said guideways being so constructed that said gripping members operate to grip a hide at one point in the travel of said hide carriers and to release a hide at another point, mechanism for impelling said hide carriers including means for engaging said hide carriers, means for disengaging said engaging means at predetermined points and means attached to each carrier for impelling a preceding carrier when said preceding carrier is disengaged from said impelling mechanism.

In testimony whereof I have hereunto subscribed my name.

ROBERT BLADES.